US007848578B2

(12) United States Patent
Suomela et al.

(10) Patent No.: US 7,848,578 B2
(45) Date of Patent: Dec. 7, 2010

(54) METHODS, DEVICES AND COMPUTER PROGRAM PRODUCTS FOR CAPTURE AND DISPLAY OF VISUALLY ENCODED DATA AND AN IMAGE

(75) Inventors: Hartti Suomela, Espoo (FI); Ingrid Schembri, Helsinki (FI); Petteri J. Saarinen, Helsinki (FI); Kirsi Harra-Vauhkonen, Espoo (FI); Maija-Leena Rissanen, Klaukkala (FI); Jukka Heinonen, Helsinki (FI); Tony N. von Knorring, Helsinki (FI)

(73) Assignee: Nokia Corporation, Espoo (FI)

( * ) Notice: Subject to any disclaimer, the term of this patent is extended or adjusted under 35 U.S.C. 154(b) by 1717 days.

(21) Appl. No.: 10/939,825

(22) Filed: Sep. 13, 2004

(65) Prior Publication Data

US 2006/0056707 A1 Mar. 16, 2006

(51) Int. Cl.
*G06K 9/72* (2006.01)
(52) U.S. Cl. .................................. 382/232; 235/436
(58) Field of Classification Search ................. 382/232, 382/100; 235/436, 483, 462.01, 462.1, 462.19
See application file for complete search history.

(56) References Cited

U.S. PATENT DOCUMENTS

| | | | | | |
|---|---|---|---|---|---|
| 4,210,802 | A | * | 7/1980 | Sakai | 235/483 |
| 4,488,678 | A | * | 12/1984 | Hara et al. | 235/462.12 |
| 4,528,443 | A | * | 7/1985 | Smith | 235/462.19 |
| 4,578,570 | A | * | 3/1986 | Mazumder et al. | 235/462.19 |
| 4,757,206 | A | * | 7/1988 | Ohta | 235/462.19 |
| 4,945,214 | A | * | 7/1990 | Hancock et al. | 235/456 |
| 5,073,954 | A | * | 12/1991 | Van Tyne et al. | 235/462.08 |
| 5,404,003 | A | * | 4/1995 | Smith | 235/462.1 |
| 5,714,745 | A | * | 2/1998 | Ju et al. | 235/469 |
| 5,946,414 | A | * | 8/1999 | Cass et al. | 382/183 |
| 6,115,508 | A | * | 9/2000 | Lopresti et al. | 382/306 |

(Continued)

FOREIGN PATENT DOCUMENTS

CN         2588480 Y       11/2003

(Continued)

OTHER PUBLICATIONS

Notification of Reason(s) for Refusal, Patent Appl. No. JP 2007-53078, dated Jul. 21, 2009, 8 pages.

(Continued)

*Primary Examiner*—Daniel G Mariam
*Assistant Examiner*—Aklilu k Woldemariam
(74) *Attorney, Agent, or Firm*—Ditthavong Mori & Steiner, P.C.

(57) ABSTRACT

Visually encoded data is captured along with one or more visual elements, the encoded data is decoded and one composite view is displayed that incorporates information related to the decoding data, such as a decode confirmation or decoded data, and the visual elements. The recognition and decoding process may additionally provide for transforming the captured visual elements to accommodate the allocated display area of small sized display, such as the display associated with a handheld image capturing device. The invention is thus suited for capturing encoded data and branding elements, such as company or product logos, and displaying the branding elements in unison with data related to the decoded information.

42 Claims, 7 Drawing Sheets

U.S. PATENT DOCUMENTS

| | | | |
|---|---|---|---|
| 6,330,975 | B1 | 12/2001 | Bunte et al. |
| 6,735,341 | B1 | 5/2004 | Horie et al. |
| 6,814,289 | B2 * | 11/2004 | Cummings et al. ........ 235/462.1 |
| 7,073,712 | B2 * | 7/2006 | Jusas et al. ................... 235/451 |
| 7,367,514 | B2 * | 5/2008 | Soule et al. .................. 235/494 |
| 7,437,430 | B2 * | 10/2008 | Rhoads ........................ 709/219 |
| 2002/0103764 | A1 | 8/2002 | Yen |
| 2002/0104884 | A1 | 8/2002 | Meier et al. |
| 2003/0058261 | A1 | 3/2003 | Challa et al. |
| 2003/0179227 | A1 * | 9/2003 | Ahmad et al. ................ 345/736 |
| 2004/0020988 | A1 | 2/2004 | Omori |
| 2004/0246529 | A1 * | 12/2004 | Pruden et al. .............. 358/3.28 |
| 2005/0029350 | A1 * | 2/2005 | Jusas et al. .................. 235/451 |

FOREIGN PATENT DOCUMENTS

| | | |
|---|---|---|
| EP | 0 969 390 A2 | 1/2000 |
| EP | 1387560 A2 | 2/2004 |
| EP | 1387560 A3 | 2/2004 |
| JP | 8-129634 A | 5/1996 |
| JP | 2000-82107 A | 3/2000 |
| JP | 2003-196557 A | 7/2003 |

OTHER PUBLICATIONS

Final Notification of Reasons for Refusal for Appl. No. JP 2007-530787 dated Mar. 15, 2010.

Rekimoto, J. et al., *CyberCode: Designing Augmented Reality Environments With Visual Tags*, Jan. 1, 2000, pp. 1-10.

Supplementary European Search Report for EP 05 78 4807 mailed Jan. 25, 2010.

Chinese Office action for corresponding CN app. No. 200580035841.5 dated Aug. 3, 2010, pp. 1-7.

* cited by examiner

METHODS, DEVICES AND COMPUTER PROGRAM PRODUCTS FOR CAPTURE AND DISPLAY OF VISUALLY ENCODED DATA AND AN IMAGE

FIELD OF THE INVENTION

This invention relates to visually encoded data, and more particularly, relates to methods, devices and computer program products that provide for capturing visually encoded data and an associated image element and displaying the decoded data and the image element on a handheld digital device.

BACKGROUND OF THE INVENTION

An increasing amount of handheld digital devices, such as, cellular telephones, personal data assistants (PDAs) and the like are currently available with image capture devices, i.e., cameras. The users of such devices benefit from being able to capture an image. i.e., take a photograph, at any point in time or any occasion. Since these devices are typically always in the possession of the user, the opportunity for the user to capture an image is omnipresent. Along with providing the ever-present opportunity to capture the image, these devices additionally provide sufficient digital memory to store multiple images central processing unit (CPU) capabilities that provide for processing and analyzing the images and, in many instances, wireless communication means that allow the user to wirelessly communicate the image to other digital device users.

However, handheld devices, such as cellular telephones, PDAs and the like that are equipped with image capture capabilities may not be limited to conventional photo capture. In addition, such devices may include functionality to capture and decode visually encoded data or symbologies. Visually encoded data typically takes the form of linear barcodes, 2-dimensional barcodes, steganographically coded data and the like. Examples of conventional 2-dimensional barcodes include Quick Response (QR) code and DataMatrix. These types of 2-dimensional symbologies allow a large amount of data to be visually encoded in a relatively small area.

For example, in one hypothetical situation, a user of an image capture equipped handheld device may be interested in purchasing a large appliance or automobile. At the point of sale, typically a retail outlet or automotive dealer, the product may be on display along with a visually encoded tag. The visually encoded tag would allow the handheld device user to capture, decode and store information related to the product, such as product specification data, pricing information and the like. As is the case in this hypothetical situation many of the visually encoded tags that a handheld device will encounter are related to a commercial product or a commercial service that is being offered. In this instance, the encoded data is generally associated with a commercial entity. For example, the large appliance may be offered by the Sony Corporation and the automobile may be offered by Ford Motor Company.

Taking into account that visually encoded tags are typically provided for the user's benefit by a commercial entity it would be advantageous to the tag provider, as well as, adding to the overall experience of the handheld device user to provide visual images, typically brand related visual images, in conjunction with the confirmation view or other displays of the decoded information. One possible solution would be to preload, in the device's memory, the graphics (company logos, fonts, colors and the like) of tag participating companies, i.e., companies using visual codes in their advertising or marketing campaigns. During decoding of the encoded data, the decode application would access the memory to choose related graphics. For example, a tag determined to have data related to the Nokia Corporation would access and display a blue Nokia logo in conjunction with the display of the decoded confirmation information or other decoded tag data. However, this method is less than ideal because all of the participating companies and brands need to known beforehand, and if new companies or brands deploy visually encoded tags the digital device would be unable to display matching graphical elements, since none would be stored in the device's memory.

Another potential solution would be to provide for downloading of graphics during the decoding process. In some instances, visually encoded data will include commands and instructions for connecting with a remote network to access additional information, for example, initiating a browser and connecting with a company website. In this example, it would be possible to connect with the outside network resource and download the company or brand graphics from the external storage site. However, this potential solution would slow down the overall user experience and the user may incur network connection charges associated with the download process.

Additionally, often the recipient of visually encoded data will have a desire to store the decoded information. For example, if the encoded data includes a coupon or a hyperlink or the link, the user may wish to store the decoded information for future use or reference. Typically, if the user stores voluminous amounts of such data, they may experience difficulty in trying to locate the data in memory. This may be especially evident if the user can not recall the title of the stored decoded data or the search functions of the application are limited to browsing.

Therefore, a need exists to develop a method, system and computer program product that will allow for graphical representations, such as company or brand information, to be displayed in conjunction with decoded confirmation information or other decoded data from visually encoded tags. The desired application will take into account the relative small size display of handheld held devices, such that the application will properly format the data to accommodate the display of the graphical representations in conjunction with the decode confirmation or other decoded data. The desired method, system and computer program will provide for efficient, user-friendly, presentation of the graphical representations on the display, in that, the method will not rely on downloading of the graphical representations from an associated network service. In addition, the desired methods, systems and computer programs will not be limited to graphical representations stored in digital device memory but, rather, will provide for graphical representations that are uniquely associated with the visually encoded tag that is being read and decoded. Additionally, a need exists to develop a more efficient and user-friendly means for locating, within device memory, stored decoded data.

BRIEF SUMMARY OF THE INVENTION

The present invention provides methods, devices and computer program products that provide for visually encoded data to be captured along with one or more visual elements, for the captured visually encoded data to be decoded and for information related to the decoding data and the visual elements to be displayed in unison. The application that performs decoding of the visually encoded data may additionally provide for transforming the captured visual elements to accommodate the allocated display area of small sized display, such as the display associated with a handheld image capturing device. Thus, the present invention provides for an efficient and user-friendly method of displaying visual elements in unison with decoded or decode confirmation information. In addition, the present invention provides for a one-to-one relationship between the encoded data and the visual elements, such that, each tag containing encoded data can have individual and unique visual elements connected with and displayable in conjunction with the encoded data.

In one embodiment of the invention a method is defined for capturing, decoding and displaying information encoded and visually represented on a visual encoded data tag. The method includes the step of directing a digital device, which includes an image capturing unit, at a visual tag that includes a visually encoded data portion and a visual element portion. The digital device will typically be a handheld digital device, such as a cellular telephone, PDA, image or video camera or the like that is equipped with an image capturing unit (i.e., a camera unit). The visual tag will typically include a first predefined portion that includes visually encoded data and a second predefined portion that includes one or more visual elements. The visually encoded data may take the form of a barcode and, in particular, 2-dimensional barcode symbologies, such as PDF417, Data Matrix, MaxiCode and QR Code or the like. The one or more visual elements may include brand elements, such as company, product or service logos or other elements connected to a company, product or service.

In alternate embodiments, the visual tag may include one integral entity that includes both a visually encoded portion and a visual element portion. For example, the geometry of the entity may define the visual element portion and encoded data is enclosed with the boundaries of the geometry. In these alternate embodiments, symbologies such as Data Glyphs may be used to encode the data within the geometric shape. Decoding of the one integral entity results in both decoded data and a visual element; i.e., the geometry of the entity without the encoded data and, possibly, shaded or otherwise filled-in.

The method additionally includes the steps of reading, at the digital device, the visually encoded data and capturing, at the digital device, the one or more visual elements. Reading the visually encoded data and capturing the visual elements will entail recognition of the predefined areas of the tag that include the visually encoded data and the visual elements. The method will also include the steps of decoding the visually encoded data and displaying, on a display associated with the digital device, a composite view that includes at least a portion of the visual element portion and information related to the decoded data. Typically, the information related to the decoded data will include decode confirmation or actual data decoded. This method provides for information related to the decoded information to be presented in a single screenshot along side the visual elements. In the instance in which the visual elements are branding elements, this method provides for the branding elements to be displayed on the digital device in conjunction with decode information.

The method may additional entail the step of formatting the captured visual element portion prior to display. Formatting of the visual element portion provides for such exemplary procedures as resizing the visual element portion, rotating or realigning the visual element portion, adjusting visual element characteristics or the like. Formatting of the visual element portion is typically required as a means of insuring that the visual elements can be properly displayed in the area allocated for display of such elements.

Additionally, the method may involve the step of initiating network communication as a result of the decoding of the visually encoded data. Examples, of such network communication include, but are not limited to, Short Message Service (SMS) communication, Multimedia Message Service (MMS) communication, electronic mail communication, cellular network communication, and Internet communication. In addition, the method may include storing the decoded data and accompanying visual elements in device associated memory, otherwise referred to as bookmarking. In embodiments that include a bookmarking step, the memory may be accessed to retrieve the stored decoded data and provide for the unified display of the information related to the stored decoded data and the visual element portion.

The invention is further defined by a visually encoded data tag that incorporates a first predefined area that encloses visually encoded data and a second predefined area adjacent to the first predefined area that encloses one or more visual elements. The visually encoded data may take the form of a barcode and, in particular, 2-dimensional barcode symbologies, such as PDF417, Data Matrix, MaxiCode and QR Code or the like. The one or more visual elements may include brand elements, such as company, product or service logos or other elements connected to a company, product or service. The predefined areas of the visual tag may be defined such that that an associated recognition application is capable of determining that the data in the first predefined area is subject to decoding and that at least a portion of the one or more visual elements are subject to user interface display. The visually encoded tag may, but is not required to, incorporate a third predefined area that is located on the tag adjacent to either or both of the first and second predefined areas. The third predefined area may include tag identifying or tag instructions data, i.e., visual data that advises the user of the digital device to capture the code or informs the user as to the nature of the code contents. In this instance, the information included in the third predefined area is typically ignored by the associated recognition application.

In an alternate embodiment of the visually encoded tag, the visual elements may be encoded to include user-interface display parameters. For example, the visual elements may take the form of a series of geometric shapes with each shape, position of a shape, color of a shape, shading of a shape or the like, indicating a specific user-interface display parameter. Examples of user-interface display parameters include font size, font type, font color, background color, dialog template and the like, which would, for example, render the user interface to follow brand or product guidelines or follow guidelines of a company's visual image.

The invention is also embodied in a computer program product for capturing, decoding and preparing for display visually encoded data and accompanying visual elements. The computer program is typically executed by a handheld digital device having image capture capabilities, such as a cellular camera telephone or the like. The product includes a computer readable storage medium having computer-readable program instructions embodied in the medium. The computer-readable program instructions includes first instructions for determining a first predefined area of a visually encoded tag that encloses visually encoded data and a second predefined area of the visually encoded tag that encloses one or more visual elements. In this regard the program instructions recognize and identify specific regions of the tag; the first predefined region includes the visually encoded data and the second predefined region includes the visual elements. The program instructions also include second instructions for decoding the visually encoded data. The decoding process will be associated with the type data encoded that is used. Foe example, if the data is encoded using a conventional 2-dimensional barcode scheme, such as QR Code or Data Matrix, then the second instructions will incorporate the requisite related decode algorithm.

The computer-readable program instructions will also include third instructions for extracting at least a portion of the one or more visual elements and applying the extracted portion to a first predefined area of a user-interface template. One or more user-interface templates are typically stored in memory associated with the digital device and form the basis forms the basis for a display view, otherwise referred to herein as a screenshot. The third instructions may additionally provide for applying decoded data or confirmation of decoding to a second predefined area of the user-interface template.

Additionally, the third instructions of the computer-readable program instructions may provide for the transforming at least a portion of the one or more visual elements prior to applying the portion to the first predefined area of the user-interface template. Transforming the visual elements provides for the elements to be modified, as necessary, to accommodate display size and other relevant display features. For example, transformation may include, resizing the visual elements, rotating or otherwise reconfiguring the alignment of the visual elements, cropping the visual elements, synthesizing the visual elements, adjusting display parameters associated with the visual elements and the like.

The computer-readable program may additionally include fourth instructions for displaying a composite view or screenshot, typically on the digital device display, that uses the user-interface template as an outline and includes the extracted portion of the one or more visual elements in the first predefined area and, typically, information related to the decoded data, such as decode confirmation or actual decoded data.

Alternatively, the invention is defined by an alternate computer program product for capturing, decoding and preparing for display visually encoded data and associated visual elements. The product includes a computer readable storage medium having computer-readable program instructions embodied in the medium. The computer-readable program instructions includes first instructions for determining a first predefined area of a visually encoded tag that encloses visually encoded primary data and a second predefined area of the visually encoded tag that encloses one or more visual elements that encode user-interface parameter data. In this regard, the primary encoded data is typically represented by a barcode symbology and the visual elements encode user-interface parameters. For example, the visual elements may be geometric shape and the parameters are encoded based on the shape of the element, the location of the element, the shade of the element, the color of the element or the like.

The computer-readable program instructions also include second instructions for decoding the visually encoded primary data and the visual elements that encode the user-interface parameters. The decoding process will be associated with the type data encoded that is used. Foe example, if the primary data is encoded using a conventional 2-dimensional barcode scheme, such as QR Code or Datamatrix, then the second instructions will incorporate the requisite related decode algorithm.

The computer-readable program instructions will also include third instructions for applying the decoded user-interface parameters to a user-interface template. Applying the decoded user-interface parameters to the user-interface template may entail changing the font type, font size, font color or background color or adding other icons or entities to the template. The third instructions may additionally provide for instructions for applying information related to the decoded primary data, such as a decode confirmation or actual decided data, to a designated area of the user-interface template.

The computer-readable program may additionally include fourth instructions for displaying a composite view or screenshot, typically on the digital device display, that uses the user-interface template as an outline and includes the applied user interface parameters and, typically, information related to the decoded data, such as decode confirmation or actual decoded data.

The invention may also be embodied in a digital device for capturing visually encoded data and visual elements and displaying decoded information in unison with the visual elements. The device will typically be a handheld digital device such as a cellular telephone, PDA, image or video camera or the like. The device will include an image capture device capable of capturing an image from a visually encoded tag, a processing unit in data communication with the image capture device that receives image data from the image capture device, a memory unit in communication with the processing unit that stores one or more user-interface templates and a display in communication with the processing unit.

Additionally the device will include an application or routine executed by the processing unit. The application is embodied within a computer readable storage medium that has computer-readable program instructions embodied within the medium. The computer-readable program instructions include first instructions for determining a first predefined area of the image that encloses visually encoded data and a second predefined area of the image that encloses one or more visual elements, second instructions for decoding the visually encoded data and third instructions for extracting at least a portion of the one or more visual elements and applying the extracted portion to a first predefined area of one of the stored user-interface templates. The display of the device will provides for the display of a composite view or screenshot based on the stored user-interface template and including the applied portion of the one or more visual elements.

Thus, the present invention provides for methods, devices and computer program products that provide for visually encoded data to be captured along with one or more visual elements, decoding the captured visually encoded data and displaying, in one composite view, information related to the decoding data and the visual elements. The application that performs decoding of the visually encoded data may additionally provide for transforming the captured visual elements to accommodate the allocated display area of small sized display, such as the display associated with a handheld image capturing device. The invention is thus suited for capturing encoded data and branding elements, such as company or product logos and displaying the branding elements in unison with data related to the decoded information. Thus, the present invention provides for an efficient and user-friendly method of displaying visual elements in unison with decoded or decode confirmation information. In addition, the present invention provides for a one-to-one relationship between the encoded data and the visual elements, such that, each tag containing encoded data can have individual and unique visual elements connected with and displayable in conjunction with the encoded data.

BRIEF DESCRIPTION OF THE DRAWINGS

Having thus described the invention in general terms, reference will now be made to the accompanying drawings, which are not necessarily drawn to scale.

Figure 1:
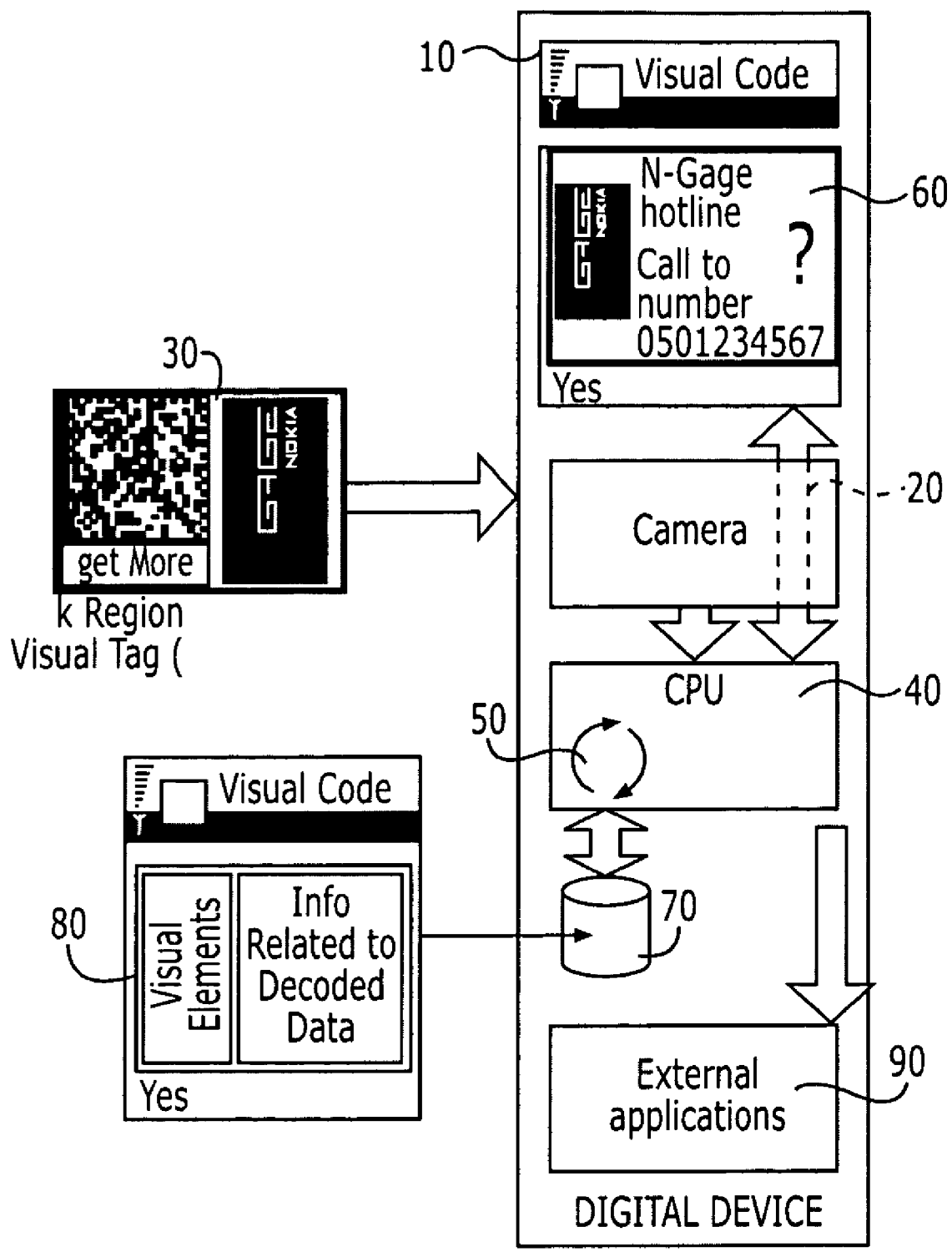

FIG. 1 is block diagram of a system for encode data capture and display, in accordance with an embodiment of the present invention.

Figure 2:
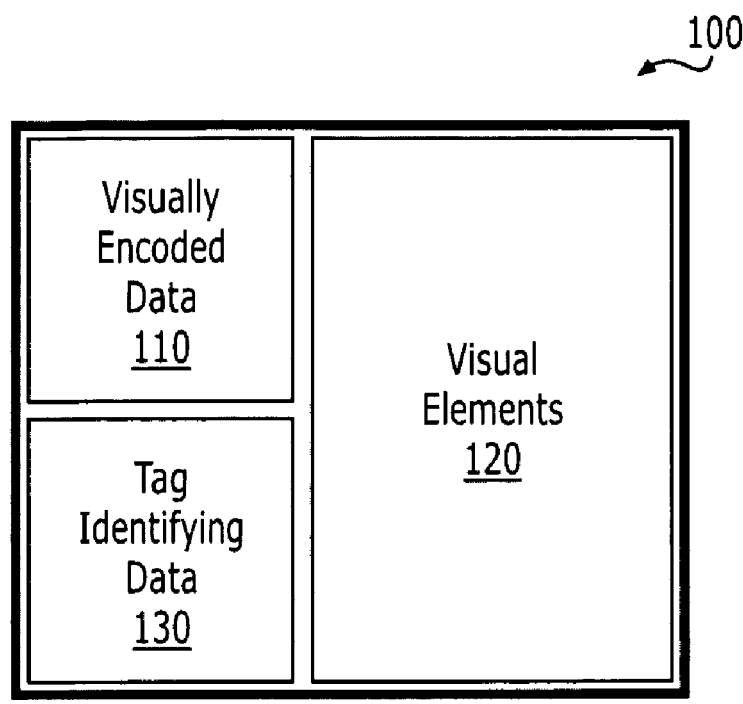

FIG. 2 is an illustration of a visually encoded data tag template, in accordance with an embodiment of the present invention.

Figure 3:
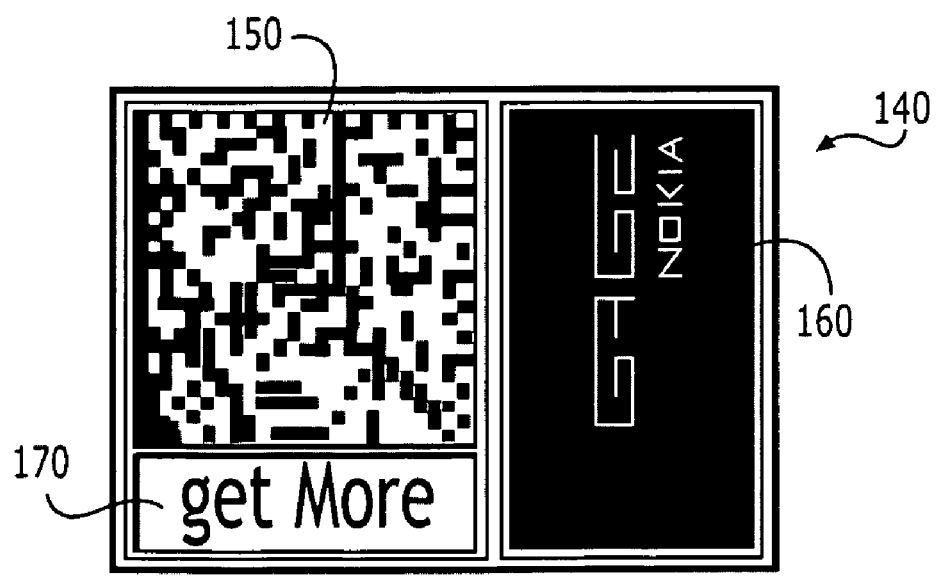

FIG. 3 is an illustration of an example of a visually encoded data tag, in accordance with an embodiment of the present invention.

Figure 4:
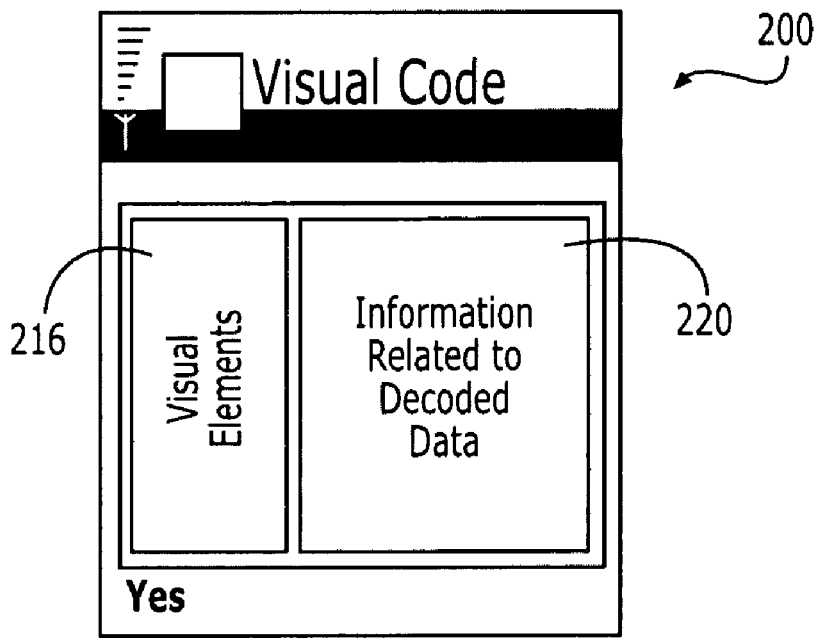

FIG. 4 is an illustration of a screenshot or view template, in accordance with an embodiment of the present invention.

Figure 5:
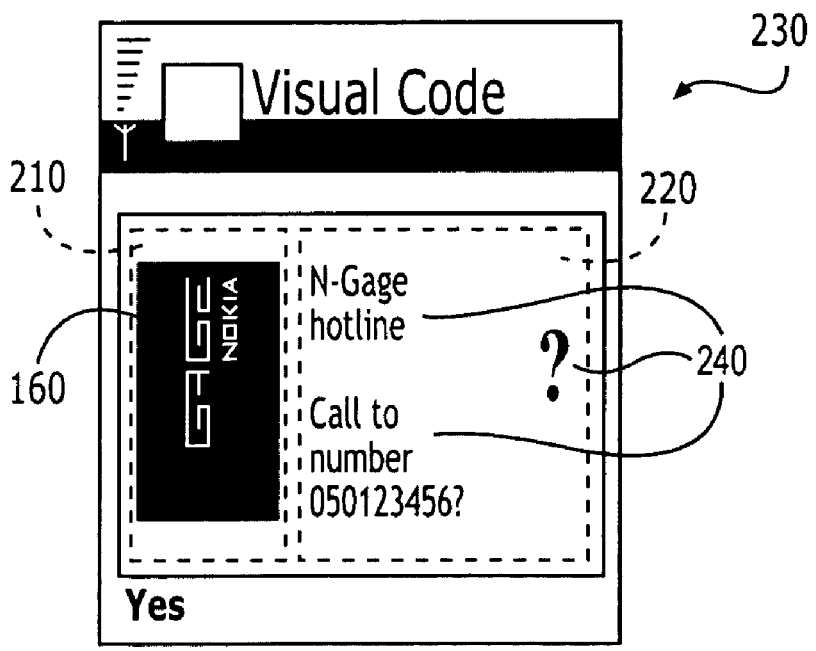

FIG. 5 is an illustration of an example of a screenshot or composite view resulting from the capture and decode of the tag of FIG. 3, in accordance with an embodiment of the present invention.

Figure 6:
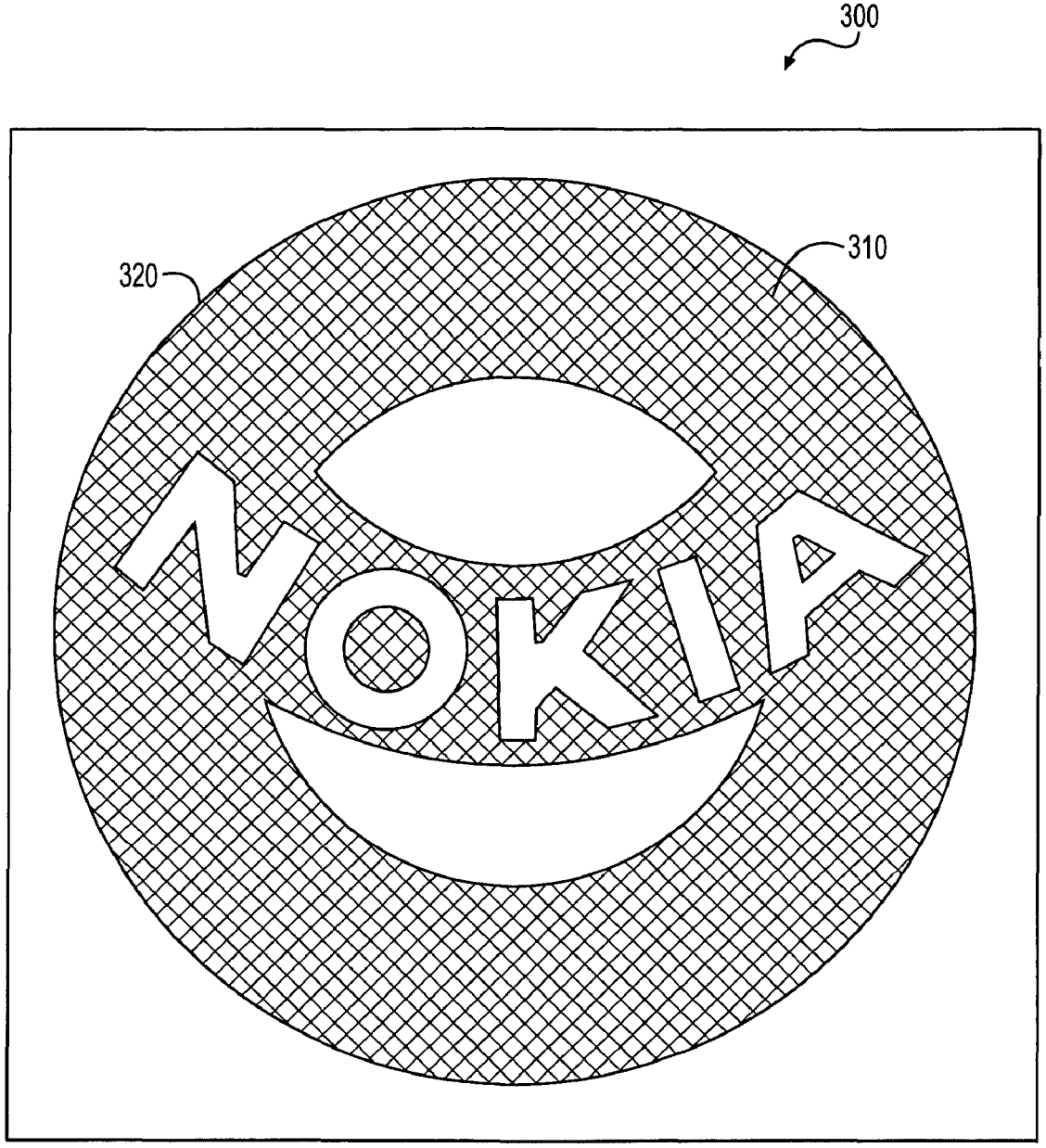

FIG. 6 is an illustration of an example of a visually encoded data tag in which the encoded data and the visual elements are embodied in a single entity, in accordance with an embodiment of the present invention.

Figure 7:
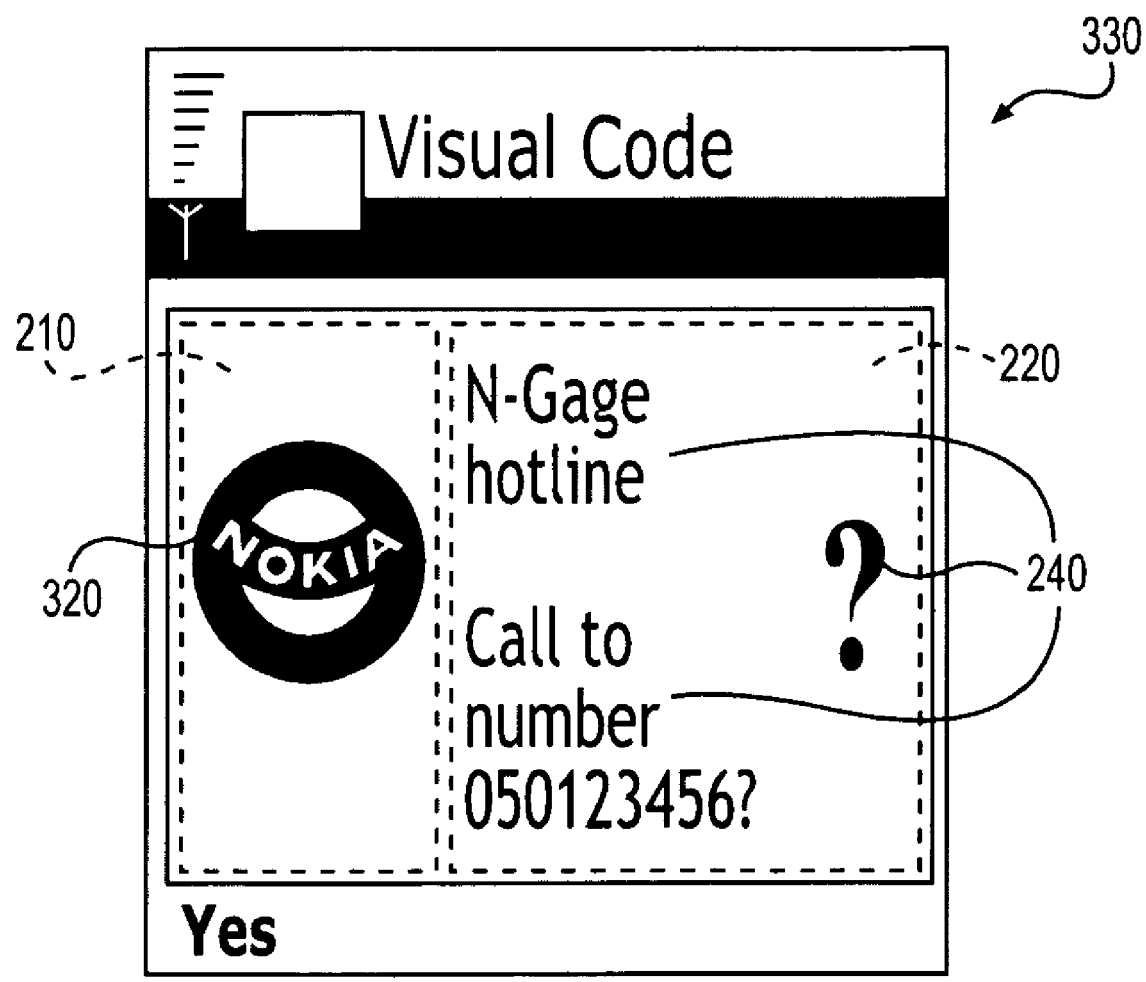

FIG. 7 is an illustration of an example of a screenshot or composite view resulting from the capture and decode of the tag of FIG. 6, in accordance with an embodiment of the present invention.

Figure 8:
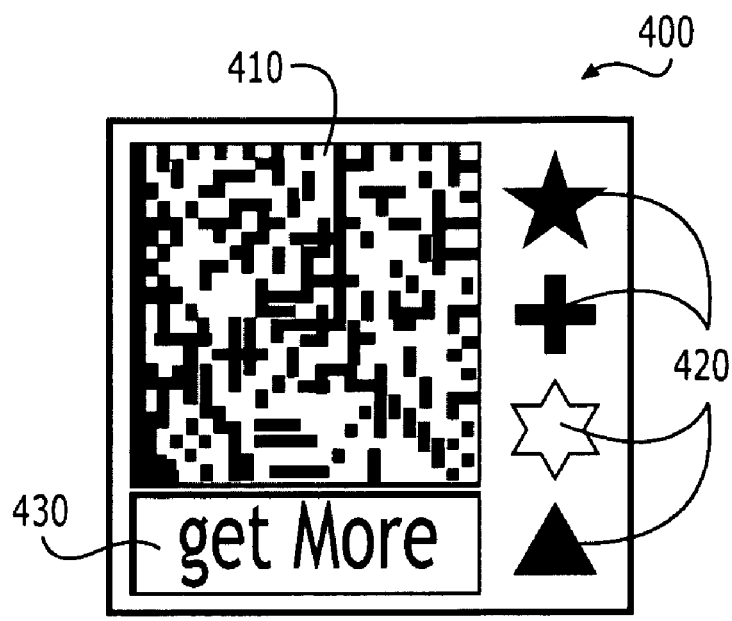

FIG. 8 is an illustration of an example of a visually encoded tag in which the visual elements define coded user-interface display parameters, in accordance with an embodiment of the present invention.

Figure 9:
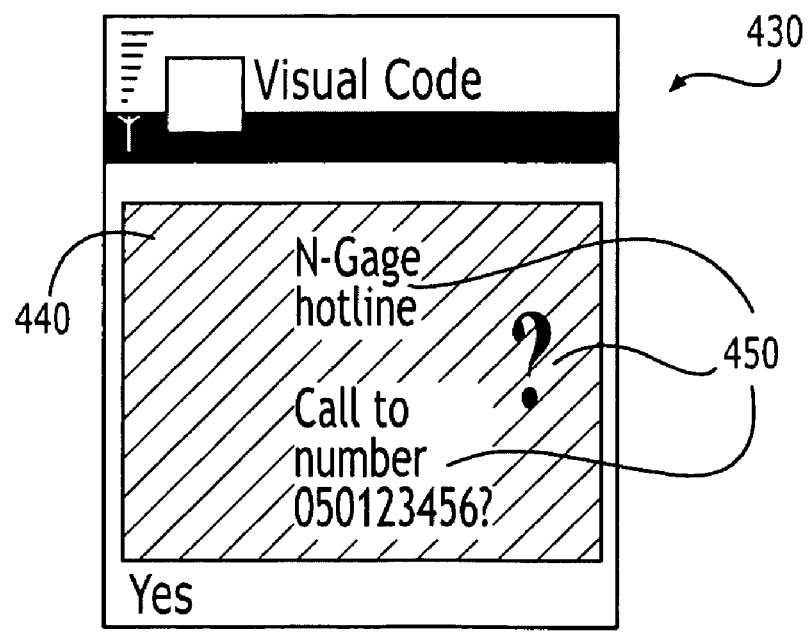

FIG. 9 is an illustration of an example of a screenshot or composite view resulting from the capture and decode of the tag of FIG. 8, in accordance with an embodiment of the present invention.

Figure 10:
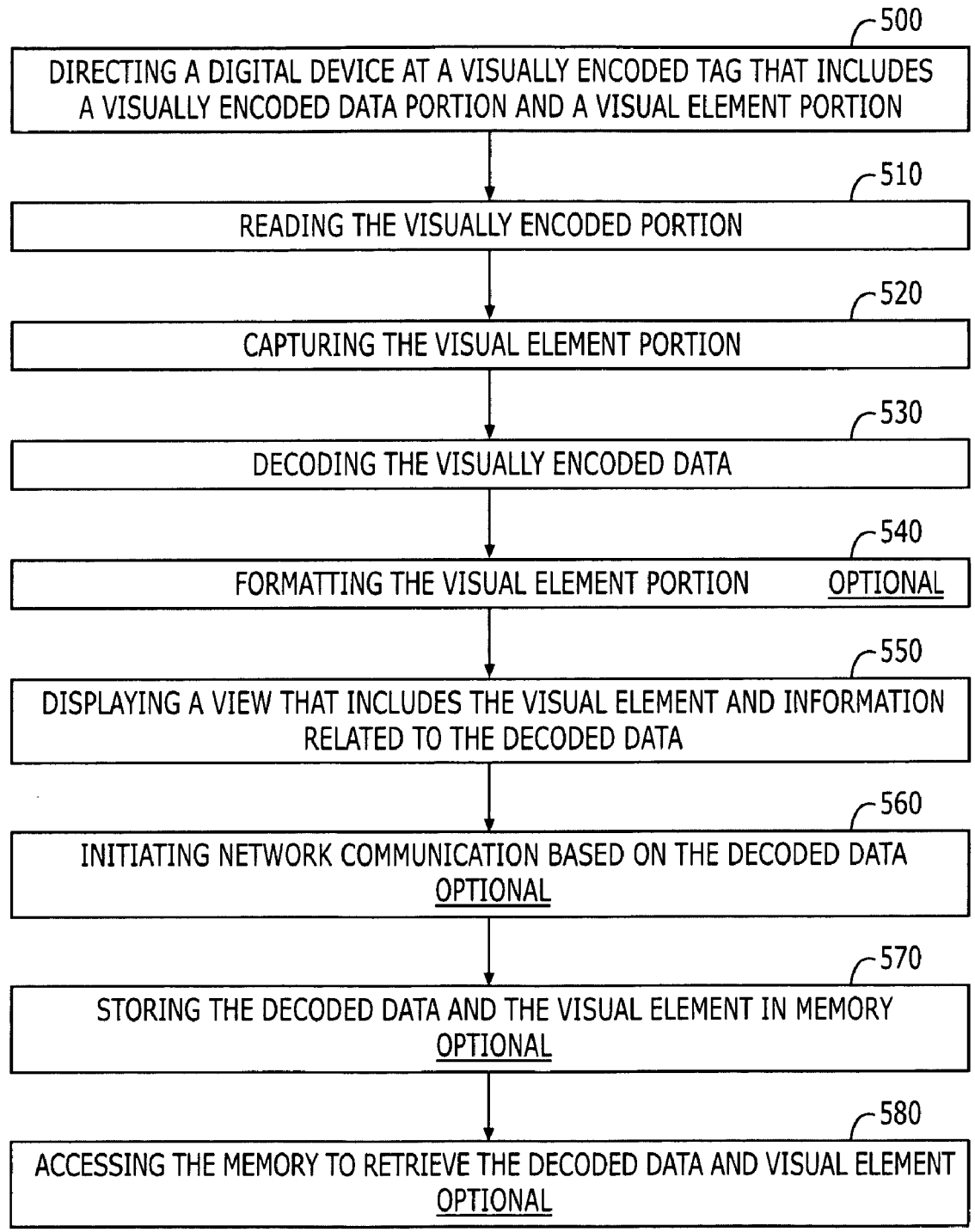

FIG. 10, is a flow diagram of a method for encoded data capture, decode and data display, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides methods, devices, computer program products and systems that provide for visually encoded data to be captured along with one or more visual elements and for the decoded information and the visual elements to be displayed in unison. The application that performs decoding of the visually encoded data may additionally provide for transforming the captured visual elements to accommodate the small sized displays, such as a display associated with a handheld image capturing device.

FIG. 1 provides an overview of the system for data capture and data display, in accordance with an embodiment of the present invention. A digital device 10 is equipped with an image capture unit 20, such as camera. The digital device will typically be a handheld digital device, such as a cellular telephone, a personal digital assistant, a digital camera, a digital video camera or the like. The image capture unit is capable of capturing images from visually encoded tag 30. The contents of the visually encoded tag are paramount to the present invention and will be explained in more detail below. A processing unit 40 disposed within the digital device receives the image data from the image capture unit and executes a recognition and decoding application 50 that recognizes predefined areas of the visually encoded tag image, performs requisite decoding operations and prepares a composite view, also referred to as a screenshot, for display on the digital device display 60. The application will access to device memory 70 to retrieve an applicable user-interface template 80. The user interface template will provide the outline or baseline for the view that the application compiles. Once the recognition and decoding operation has performed decoding and presented a decoded data composite view, optional external applications 90, such as network communication applications may be initiated based on commands in the decoded data.

FIGS. 2 and 3 provide illustrations of a visually encoded tag template and an example of a visually encoded tag, respectively, in accordance with an embodiment of the present invention. The visually encoded tag template 100 of FIG. 2 defines specific areas for enclosing the visually encoded data and for enclosing the visual elements. The specific areas are subsequently recognized by the associated recognition and decode application according to their size and location on the tag. Requisite processing occurs of the information enclosed in a predefined tag area will occur once the area had been recognized. In the illustrated embodiment of FIG. 2, a first predefined area 110 defines the portion of the tag that encloses the visually encoded data. The visually encoded data may be in the form of any known visual coding symbology. Typically, the encoded data will be in barcode form. Two-dimensional barcode symbologies may be preferred, as they provide for more information to be encoded in a smaller area. Examples of two-dimensional barcodes include PDF417, Data Matrix, MaxiCode and Quick Response (QR) Code.

The second predefined area 120 of visually encoded tag template 100 defines the portion of the tag that encloses one or more visual elements. The term "visual element" is used to define specific visual entities, items or images that are related to the information visually encoded in the first predefined area. In one embodiment of the invention the visual elements are further defined as branding elements, such as product, service or company, logos, symbols, insignia or the like. As will be explained in more detail below, the recognition and decode application that is executed by the tag capturing device will recognize the second predefined area as the area that defines one or more visual elements. The application will then process the visual elements accordingly. In one embodiment of the invention, the visual elements may be optionally formatted, i.e., transformed and presented for display in a composite view or screenshot in unison with information related to the decoded data, such as a decode conformation or actual decoded data. In another embodiment of the invention the nature and characteristics of the visual elements, such as shape, location, color, shading or the like, may define user-interface parameters or settings. In such case, processing of the visual elements will entail setting the user-interface parameters according to the characteristics of the visual elements.

The third predefined area 130 of visually encoded tag template 100 defines an optional portion of the tag that encloses tag identifying data. Tag identifying data is optional visual data that may be placed on the tag to notify a digital device user that encoded data exists and that capturing the data may be desirable, i.e., recognizing the visually encoded data as a source for action. The data enclosed by the third predefined area is not processed by the recognition and decode application, however, the size and shape of the third predefined area may be relied upon by the recognition algorithm to locate and identify either or both of the first and second predefined areas.

FIG. 3 provides an example of a visually encoded tag 140, in accordance with an embodiment of the present invention. The first predefined area encloses visually encoded data 150, in this example, DataMatrix code, a conventional 2-dimensional barcode symbology. The second predefined area encloses one or more visual elements 160. In the illustrated example the visual element is a branding element that includes a product logo, "gage" and a company logo, "nokia". The optional third predefined area 170 encloses tag identifying data, in this example, the term "get more" is included to inform a user that potentially-desirable encoded information is located on the tag.

FIGS. 4 and 5 provide illustrations of a display screenshot template and an example of display screenshot, in accordance with an embodiment of the present invention. As previously noted in the discussion related to FIG. 1, the digital device will capture the image of the visually encoded tag and a recognition and decode application will be executed. In one embodiment the application will prepare display screenshots or composite views that incorporate at least a portion of the one more visual elements present in the second predefined area of the visually encoded tag. FIG. 4 illustrates an example of screenshot, otherwise referred to as a view, template 200. The application of the present will select an appropriate template from one or templates stored in digital device memory. Selection of an applicable template may be based on the shape or size of the visual elements present on the tag or the selection may be designated on the tag via an encoded template designator. Alternatively, other modes of template selection may be possible. The general shape of the templates will be aligned with the size of the viewable area of the display. Thus, in embodiments of the present invention in which the tags are captured and decoded on handheld devices having relatively smaller type displays, the associated templates will reflect the shape and size of the display.

The screenshot template of FIG. 4 includes a first region 210 designated for visual elements and a second region 220 designated for information related to the decoded data. Typically, in order for the one or more visual elements of the tag to be included within the first region of the screenshot template transformation, otherwise referred to as re-formatting, of the graphics will be required. Such transformation of the graphics may entail, but is not limited to, rotating or reconfiguring the visual elements, resizing the visual elements, filtering the visual elements to remove distortions, and adjusting visual display parameters, such as, contrast, tint, color and the like. The second region 220, which is designated for information related to the decoded data, may include decode confirmation or specific decoded information. For example, the second region may include confirmation that the data has or has not been properly decoded or the second region may provide for decoded data, such as, for example, instructions for the user to initiate a network connection.

FIG. 5 provides an example of a display screenshot 230 resulting from capturing of the visually encoded tag 100 of FIG. 3 and using the template 200 of FIG. 4 as the outline. The dotted lines are illustrated to show the corresponding template regions and are not actually depicted in the displayed screenshot. The first region 210 includes visual element 160. The visual element has been transformed, i.e., re-formatted to fit the size constraints of the first region. The second region 220 includes information related to the decoded data 240. In this illustrated example, the information is decoded data, in the form of a help-line, referred to in the screenshot as a hotline, telephone number. The user of the digital device, upon being provided with the information in the screenshot may choose to activate the network communication; i.e., dial the helpline number or the user may choose to bookmark the decoded data. Bookmarking of the decoded data will result in the displayed screenshot being stored in device memory for future access and use.

In an alternate embodiment of the present invention, the visually encoded data tag will represent the visual elements and the encoded data collectively as a unified object. For example, FIG. 6 depicts a visually encoded data tag 300, in which the visual elements and the visually encoded data are represented in a single unified object, in accordance with an embodiment of the present invention. The visually encoded data 310 is embedded in the geometric shape. An example of a coded symbology that provides for embedding the code in a picture or a shape is Dataglyphs, available from PARC Solutions, of Palo Alto, Calif. The visual element 320 is the outline of the geometry that encloses the visually encoded data. In the illustrated embodiment the outline of the shape provides for the formation of a company name "Nokia".

The visually encoded data tag 300 of FIG. 6 will be captured, decoded and displayed in the following manner. A digital device equipped with an image capture unit will capture the image of the visually encoded tag. A corresponding recognition and decode application will identify the encoded data and the visual element and perform requisite decoding of the encoded data. In addition, the application will access device memory to retrieve an applicable screenshot template. For example, the application may retrieve a template similar to the template shown in FIG. 4. The visual element(s) may then be replicated in the region of the template designated for such inclusion. Similar to the previously discussed embodiment, it may be necessary to transform or re-format the visual element prior to replicating the visual element in the designated area of the screenshot template.

FIG. 7 provides for an example of a screenshot 330 resulting from capturing the visually encoded data tag 300 of FIG. 6 and implementing the screenshot template of FIG. 4, in accordance with an embodiment of the present invention. The first region 210 includes visual element 160. The visual element has been transformed, i.e., re-formatted to fit the size constraints of the first region. Similar to the screenshot shown in FIG. 5, the second region 220 includes information related to the decoded data 240.

In yet another embodiment of the present invention, the visually encoded data tag will include designated areas for "primary" visually encoded data and visual elements that encode user-interface display parameters. In this embodiment since both designated areas include data that is encoded, the first predefined area is specified as enclosing the "primary" encoded data or the data which the user desires to capture, decode and display. The second predefined area encloses the one or visual elements, which, in this embodiment, encode user-interface display parameters. For example, the visual elements may be a series of geometric shapes with each shape related to a specific user-interface display parameter. The information may be encoded using any one of several visual means, for example, shape of the visual elements, location of the visual elements, color of the elements or shading of the elements. In lieu of geometric shapes the visual elements of this embodiment may take the form of another known symbology, such as barcode or the like. Examples, of user-interface display parameters that may be adjusted by the coded visual elements include, but are not limited to, font type, font size, font color, background color, border type, inclusion of icons and the like. In this embodiment, the visual elements are typically not replicated and displayed in decode data related screenshot but, rather, serve to define the parameters related to the decode data related screenshots.

FIG. 8 provides an example of a visually encoded tag 400 having a designated area for primary visually encoded data and a designated area for visual elements that code user-interface display parameters, in accordance with an embodiment of the present invention. The first predefined area encloses visually encoded data 410, in this example, Data Matrix code, a conventional 2-dimensional barcode symbology, although code types are possible. The second predefined area encloses one or more visual elements 420 coded with user-interface display parameter information. In the illustrated example the visual elements are geometric shapes and the shapes and the shading of the shapes define the user-interface display parameters. The optional third predefined area encloses tag identifying data 430, in this example, the term "get more" is included to inform a user that potentially-desirable encoded information is located on the tag.

FIG. 9 provides for an example of a screenshot 430 resulting from capturing the visually encoded data tag 400 of FIG. 8, in accordance with an embodiment of the present invention. The template that is used to create screenshot 430 will differ from the previously illustrated embodiments, in that, the template will only include one designated area for enclosing the information related to the decoded data. Since the visual elements in the tag do not represent images that will be replicated and displayed but, rather, represent encoded user-interface display parameters, the template will not include a designated area for replicating the visual images. The general display region 440 includes information related to the decoded data 450. The data encoded in the visual elements of tag 400 is reflected in the display parameters of general display region. For example, the shading of the general display region indicates that the visual elements encoded a specific background color for the user-interface display. Other parameters that may have been set by the encoding of the visual elements include font type, font size, font color and the like.

FIG. 10 provides a flow diagram of a method for capturing and displaying, in unison, visually encoded information and one or more visual elements that are included on a visual tag, in accordance with an embodiment of the present invention. At step 500, a digital device that including an image capture unit is directed or otherwise aimed at a visually encoded tag. The visually encoded tag includes an encoded data portion and a visual element portion. The digital device will typically be a handheld digital device, such as a camera equipped cellular telephone, a camera equipped personal digital assistant (PDA), a digital camera, a video camera or the like. The encoded data portion of the tag may include any known coded symbology, such as a barcode. In one embodiment of the invention the encoded data portion will be a two-dimensional bar code symbology, such as PDF417, Data Matrix, Maxi-Code, QR Code or the like. The visual element may take the form of a branding element, such as logo or other insignia of a product, service or company. Typically, the encoded data portion and the visual element portion of the visually encoded tag will be separate, distinct regions of the tag that will be recognizable by an associated detection and decode algorithm. However, in one alternate embodiment, such as illustrated by FIG. 6, the encoded data portion and the visual element portion may be integrally incorporated in a single entity.

At step 510, the digital device reads the visually encoded data. Reading the visually encoded data entails executing a recognition application that applies an algorithm to determine the location of the encoded data portion on the tag. At step 520, the visual element portion of tag is captured. Capturing the visual element portion entails executing the recognition application to apply an algorithm to determine the location of the visual element portion of the tag and, subsequently storing the visual element in a memory unit. At optional step 530, the captured visual elements may be required to undergo re-formatting to prepare the visual images for application to a screenshot or view template. Re-formatting may entail rotating or reconfiguring the visual elements, resizing the visual elements, filtering the visual elements, otherwise adjusting visual element display parameters or the like.

The method further includes step 540, at which the digital device decodes the visually encoded data. The decoding of the data entails executing a decoding algorithm that corresponds to the encoding method used to encode the visual data. At step 550, once the data has been decoded the method provides for the step of displaying, on a display associated with the digital device, a composite view that includes at least a portion of the visual element portion and information related to the decoded data. Providing for the composite view will typically involve accessing memory to retrieve a view template, extracting the visual elements from the captured visual elements and applying the visual elements to a predefined area of the template. In addition, information related to the decode data, such as decode confirmation or specific decoded data, is applied to another predefined area of the template.

At optional step 560, the method may include initiating network communication as a result of the decoding of the visually encoded data. Initiating network communication may occur automatically based on the decoded data or it may be initiated at the bequest of the digital device user. For example, the decoded information that is displayed in a view to the device user may suggest a form of network communication and the user can choose to initiate the communication, defer the communication or forego the communication. Examples of forms of network communication include, but are not limited to, Short Message Service (SMS) communication, Multimedia Message Service (MMS) communication, electronic mail communication, cellular network communication, and Internet communication.

The method may further include optional step 570, storing the decoded data and the visual element in a digital device memory. Storing the decoded data and the visual element allows for the data to be bookmarked and subsequently displayed at the bequest of the user. Therefore, at optional step 580, if the method includes storing the decoded data and the visual element. The method may also include accessing the digital device memory to retrieve the stored decoded data and displaying, in a single composite view, at least a portion of the stored visual element and at least a portion of the stored decoded data. Additionally, storing the visual element and the decoded data, in unison, provides for a composite bookmark, which allows the user to browse stored data and identify data based on the displayed visual element in the bookmark.

Thus, the present invention provides for methods, devices and computer program products that provide for visually encoded data to be captured along with one or more visual elements, decoding the captured visually encoded data and displaying, in one composite view, information related to the decoding data and the visual elements. The application that performs decoding of the visually encoded data may additionally provide for transforming the captured visual elements to accommodate the allocated display area of small sized display, such as the display associated with a handheld image capturing device. The invention is thus suited for capturing encoded data and branding elements, such as company or product logos and displaying the branding elements in unison with data related to the decoded information. Thus, the present invention provides for an efficient and user-friendly method of displaying visual elements in unison with decoded or decode confirmation information. In addition, the present invention provides for a one-to-one relationship between the encoded data and the visual elements, such that, each tag containing encoded data can have individual and unique visual elements connected with and displayable in conjunction with the encoded data.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the cope of the appended claims. Although specific terms are employed herein, they are used in a generic and descriptive sense only and not for purposes of limitation.

That which is claimed:

1. A method comprising:
   directing reading, at a digital device, of visually encoded data included as a portion of a visual tag, the visual tag further including a visual element portion that is separate from the visually encoded data;
   directing capturing, at the digital device, of the visual element portion;
   decoding, at the digital device, the visually encoded data; and
   providing for displaying, on a display associated with the digital device, a composite view that includes at least a portion of the visual element portion of the visual tag and information related to the decoded data for the visual tag.

2. The method of claim 1, further comprising formatting the captured visual element portion prior to display.

3. The method of claim 2, wherein formatting the captured visual element portion prior to display further comprises performing at least one format function chosen from the group consisting of rotating the visual element, resizing the visual element, filtering the visual element and adjusting image parameters of the visual element.

4. The method of claim 1, wherein capturing the visual element portion comprises capturing a branding element.

5. The method of claim 1, wherein reading the visually encoded data comprises reading the visually encoded data at the digital device comprising a device chosen from the group consisting of a cellular telephone, a personal data assistant, a digital camera and a video camera.

6. The method of claim 1, wherein providing for displaying, on a display associated with the digital device, comprises displaying within a single screen shot at least a portion of the visual element and information related to the decoded data in which the information related to the decoded data comprises confirmation that the data has been decoded.

7. The method of claim 1, wherein providing for displaying, on a display associated with the digital device, comprises displaying within a single screen shot at least a portion of the visual element and information related to the decoded data in which the information related to the decoded data comprises at least a portion of the decoded data.

8. The method of claim 1, wherein capturing the visual element portion comprises capturing barcode data.

9. The method of claim 1, wherein capturing the visual element portion comprises capturing two-dimensional barcode data.

10. The method of claim 1, wherein capturing the visual element portion comprises capturing visually encoded data chosen from the group of two-dimensional barcode symbologies consisting of PDF417, Datamatrix, Maxicode and QR Code.

11. The method of claim 1, wherein capturing the visual element portion comprises capturing the visually encoded data portion and the visual element portion integrally incorporated in a single entity.

12. The method of claim 11, wherein capturing the visual element portion comprises capturing the visually encoded data portion and the visual element portion integrally incorporated in the single entity in which the visually encoded data portion is DataGylph encoded.

13. The method of claim 1, further comprising initiating network communication as a result of the decoding of the visually encoded data.

14. The method of claim 13, wherein initiating network communication as a result of the decoding of the visually encoded data further defines network communication as chosen from the group consisting of Short Message Service (SMS) communication, Multimedia Message Service (MMS) communication, electronic mail communication, cellular network communication, and Internet communication.

15. The method of claim 1, further comprising storing the decoded data and the visual element in a digital device memory.

16. The method of claim 15, wherein storing the decoded data and the visual element in a digital device memory further provides for generating a bookmark that includes at a portion of the visual element.

17. The method of claim 15, further comprising accessing the digital device memory to retrieve the stored decoded data and displaying on the display associated with the digital device, within a single screen shot at least a portion of the stored visual element and at least a portion of the stored decoded data.

18. The method of claim 17, wherein accessing the digital device memory to retrieve the stored decoded data further comprises accessing a bookmark that includes a least a portion of the visual element and is associated with the decoded data.

19. A visually encoded data tag apparatus, the apparatus comprising;
   a first predefined area that encloses visually encoded data; and
   a second predefined area adjacent to the first predefined area, wherein the second predefined area encloses one or more visual elements including one or more branding elements, wherein the visually encoded data enables, responsive to decoding thereof, displaying, on a display associated with a digital device, a composite view that includes at least a portion of the one or more visual elements and information related to the decoded visually encoded data.

20. The apparatus of claim 19, wherein an associated recognition application determines that the data in the first predefined area is subject to decoding and at least a portion of the one or more visual elements is subject to user interface display.

21. The apparatus of claim 19, wherein the second predefined area that encloses one or more visual elements further defines the one or more visual elements as elements that are encoded with user-interface display parameters.

22. The apparatus of claim 21, wherein an associated recognition application determines that the data in the first predefined area is subject to general decoding and that the elements in the second predefined area define user-interface display parameters that are implemented for the display of the decoded data.

23. The apparatus of claim 19, wherein the first predefined area that encloses visually encoded data further defines the visually encoded data as barcode data.

24. The apparatus of claim 19, wherein the first predefined area that encloses visually encoded data further defines the visually encoded data as two-dimensional barcode data.

25. The apparatus of claim 19, wherein the first predefined area that encloses visually encoded data further defines the visually encoded data as two-dimensional barcode data having a barcode type chosen from the group consisting of PDF417, Data Matrix, MaxiCode and QR Code.

26. The apparatus of claim 19, further comprising a third predefined area adjacent to at least one of the first and second areas, wherein the third predefined area encloses tag identifying data.

27. A computer program product comprising a non transitory computer readable medium having computer-readable program instructions embodied in the medium, the computer-readable program instructions comprising:
 first instructions for determining a first predefined area of a visually encoded tag that encloses visually encoded data and a second predefined area of the visually encoded tag that encloses one or more visual elements;
 second instructions for decoding the visually encoded data; and
 third instructions for extracting at least a portion of the one or more visual elements and applying the extracted portion to a first predefined area of a user-interface template, wherein the user-interface template forms the basis for a display screenshot and is selected based on a characteristic of the visual elements, wherein the visually encoded data enables, responsive to decoding thereof, displaying, on a display associated with a digital device, a composite view of that includes at least a portion of the one or more visual elements and information related to the decoded visually encoded data.

28. The computer program product of claim 27, wherein the third instructions third instructions for extracting at least a portion of the visual elements and applying the extracted portion to a first predefined area of a user-interface template further provides for applying decoded data to a second predefined area of the user interface template.

29. The computer program product of claim 27, wherein the third instructions for extracting at least a portion of the one or more visual elements and applying the extracted portion to a first predefined area of a user-interface template further provides for transforming at least a portion of the one or more visual elements to conform at least a portion of the one or more visual elements to the predefined area of the user-interface template.

30. The computer program product of claim 29, wherein transforming at least a portion of the one or more visual elements is further defined as performing a transformation operation chosen from the group consisting of rotating the visual elements, resizing the visual elements, filtering the visual elements and adjusting image parameters of the visual elements.

31. The computer program product of claim 30 further comprising fourth instructions for displaying an image that uses the user-interface template as an outline and includes the extracted portion of the one or more visual elements in the first predefined area.

32. A computer program product comprising a non-transitory computer readable medium having computer-readable program instructions embodied in the medium, the computer-readable program instructions comprising:
 first instructions for determining a first predefined area of a visually encoded tag that encloses visually encoded primary data and a second predefined area of the visually encoded tag that encloses one or more visual elements that encode user-interface parameter data;
 second instructions for decoding the visually encoded primary data and the visual elements that encode user-interface parameters; and
 third instructions for applying the decoded user-interface parameters to select a user-interface template defining a template for display of information based on the decoded visually encoded primary data, the user-interface template being selectable based on a characteristic of the visual elements, wherein the visually encoded data enables, responsive to decoding thereof, displaying, on a display associated with a digital device, a composite view of that includes at least a portion of the one or more visual elements and information related to the decoded visually encoded data.

33. The computer program product of claim 32, wherein the user-interface parameter data is chosen from the group consisting of font type, font size, font color, background color, and dialog template.

34. The computer program product of claim 32, wherein the third instructions for applying the decoded user-interface parameters to a user-interface template further includes instructions for applying information related to the decoded primary data to a designated area of the user-interface template.

35. The computer program product of claim 32, further comprising fourth instructions for displaying an image that uses the user-interface template as an outline and includes the applied user-interface parameters and information related to the decoded primary data.

36. A digital device comprising:
 an image capture device configured to capturing an image from a visually encoded tag;
 a processing unit in data communication with the image capture device that receives image data from the image capture device;
 a memory unit in communication with the processing unit that stores one or more user-interface templates;
 an application executed by the processing unit, the application non-transitory computer readable medium having computer-readable program instructions embodied in the medium, the computer-readable program instructions comprising:
  first instructions for determining a first predefined area of the image that encloses visually encoded data and a second predefined area of the image that encloses one or more visual elements;
  second instructions for decoding the visually encoded data; and
  third instructions for extracting at least a portion of the one or more visual elements and applying the extracted portion to a first predefined area of one of the stored user-interface templates, the user-interface templates each defining a template for display of the decoded visually encoded data, the user-interface templates being selectable based on a characteristic of the visual elements; and
 a display in communication with the processing unit that provides for the display of a screenshot based on the stored user-interface template and including the applied portion of the one or more visual elements.

37. The device of claim 36, wherein the memory unit is further defined as storing the decoded data and at least a portion of the one or more visual elements.

38. The device of claim 36, wherein the application executed by the processing unit further includes fourth instructions for generating and storing a bookmark that includes a least a portion of the one or more visual elements and is associated with the decoded data.

39. The device of claim 38, wherein the bookmark is used by a device user to identify the decoded data when the user browses device memory.

40. An apparatus comprising:
a processor and memory including computer program code, the memory and the computer program code configured to, with the processor, cause the apparatus to:
direct reading of visually encoded data included as a portion of a visual tag, the visual tag further including a visual element portion;
direct capture of the visual element portion;
decode the visually encoded data; and
provide for displaying, on a display of a digital device performing the reading, capturing and decoding, a composite view that includes at least a portion of the visual element portion of the visual tag and information related to the decoded data for the visual tag.

41. The apparatus of claim 40, wherein the memory and computer program code are further configured to, with the processor, cause the apparatus to format the captured visual element portion prior to display.

42. The apparatus of claim 40, wherein the memory and computer program code being configured to, with the processor, cause the apparatus to provide for displaying includes causing the apparatus to display within a single screen shot at least a portion of the visual element and information related to the decoded data in which the information related to the decoded data comprises at least a portion of the decoded data.

* * * * *